United States Patent [19]

Davis

[11] Patent Number: 4,802,854
[45] Date of Patent: Feb. 7, 1989

[54] EDUCATIONAL BLOCKS

[76] Inventor: Pauline D. Davis, 42 Redwood Rd., Severna Park, Md. 21146

[21] Appl. No.: 185,898

[22] Filed: Apr. 25, 1988

[51] Int. Cl.$^4$ .................. G09B 1/06; A63H 33/10
[52] U.S. Cl. ................................ 434/159; 446/124
[58] Field of Search ............... 434/159, 160, 161, 172; 446/124, 127

[56] References Cited

U.S. PATENT DOCUMENTS

| | | | |
|---|---|---|---|
| 2,327,471 | 8/1943 | Tiers | 434/172 |
| 2,940,211 | 6/1960 | Kelley | 446/124 X |
| 3,270,452 | 9/1966 | D'Elia et al. | 434/172 X |
| 3,305,945 | 2/1967 | Crawford et al. | 434/159 |

Primary Examiner—William H. Grieb

[57] ABSTRACT

A novel set of large letters of the alphabet and numbers with tracks for their support and combination is provided for manufacture as both an educational and a creative plaything.

6 Claims, 2 Drawing Sheets

EDUCATIONAL BLOCKS

The principal object of my invention is to provide a small child with an introduction to alphabetical and numerical shapes, without any emphasis on their meaning or even rational orientation. To that end, I provide a set of simple blocks in the shape of alphabetical letters and numbers which the child can fit vertically into a groove in a support track, without regard to accepted orientation. Skewed transverse support grooves may also be provided in the track, so that random or uninhibited orientation of blocks is even encouraged. Auxiliary support tracks enable the child to support a letter or number block individually and one block on another in any desired orientation. Where the blocks are of wood, I optimally supply sandpaper and provide at least one of the auxiliary support blocks with a rounded outside edge and an edge with an acute angle, to better serve as a sanding block for inside curves and inside angles. The child should be encouraged initially to play with the blocks and become familiar with their shapes. Their meaning and proper orientation can come later, at which time lower extended portions on the blocks will assure that the full body of a given letter or number is not obscured by the portions of the support track defining its groove.

Three-dimensional letters or numbers are old, particularly in making up signs. However, where a track is provided for such indicia, no provision is made for spontaneous orientation as in my invention. An example of interlocking character blocks to fashion a sign is provided by U.S. Pat. No. 3,270,452 to D'Elia. Also, simple letters and numbers appear in U.S. Pat. No. 2,327,471 to Tiers. However, D'Elia's regimentation on how the blocks can be oriented one to another is the antithesis of my concept. As for Tiers, no support tracks of the veratility I employ are disclosed. Moreover, Tiers' letter and number blocks lack extended lower portions for fitting into the groove of a support track. Moreover, the children's Television Workshop has recently introduced its ALPHABET ROADWAY TM, comprising track sections in the form of letters which interconnect to form a roadway for toy vehicles. While a greater degree of random orientation is possible, the letters are not erected in separate track members as in my invention.

This invention is illustrated by the accompanying drawing, which is briefly described as follows.

Figure 1:
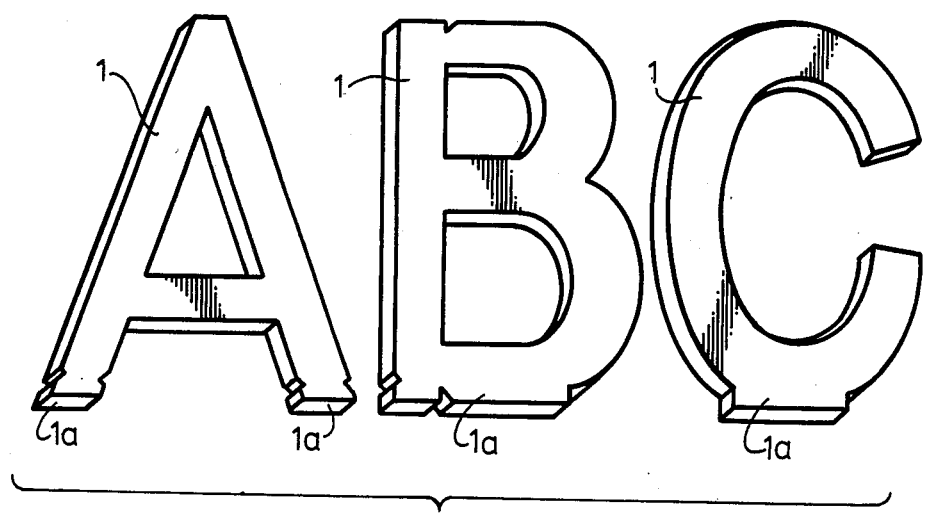
FIG. 1 is a substantially frontal perspective view of representative blocks A, B and C.

With particular reference to FIG. 1, the letter blocks A, B and C are generally denoted by reference numeral 1. Each has one or more suitable lower extension(s) 1a for insertion in a support track groove, such that the full body of a properly oriented letter or numeral will not be obstructed by portions of the track flanking or defining the groove. Preferably, the blocks 1 are cut from wood of uniform thickness.

Figure 2:
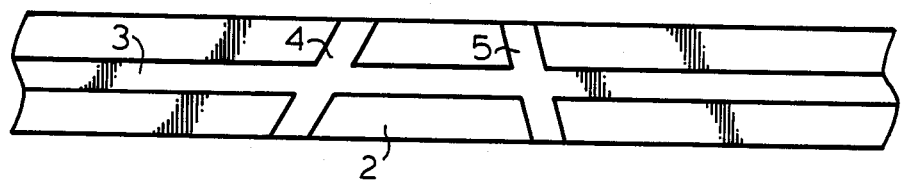
FIG. 2 is a top view of the main support track.
Figure 3:
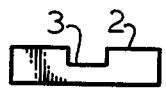
FIG. 3 is an end view of the main support track.

FIGS. 2 and 3 are top and end views of support track 2, having a longitudinal rectilinear groove 3 for snugly receiving the extensions 1a of the blocks or any other edge portion of the blocks as the child may desire. Transverse intersecting grooves 4 and 5 are also provided, at angles to groove 3 other than a right angle. The width of grooves 3, 4 and 5 is substantially the same as the thickness of blocks 1, such that a snug fit of the block within the groove is obtained.

Figure 4:
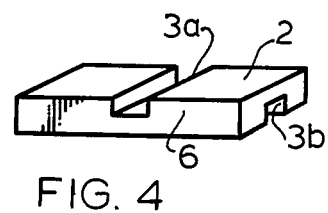
FIG. 4 is a perspective view of an auxiliary support track.

FIG. 4 shows an auxiliary support track 6 having a groove 3a on the top and a transverse groove 3b on the bottom or opposite face of this track. The angle of the two grooves 3a to 3b is shown at 90° but in practice they may be fashioned or cut at other angles to each other. The track 6 is shorter than the main support track 2. Otherwise, its grooves 3a and 3b engage the extended lower portion or any other edge portion of a block 1 in the same manner as grooves 4 and 5.

Figure 5:
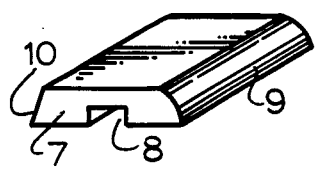
FIG. 5 is a perspective view of an auxiliary track with special edges.

FIG. 5 shows an auxiliary support track 7 with a groove 8 to receive portions of blocks 1 in a manner similar to grooves 3, 3a, 3b, 4 and 5. Also, track 7 is rounded on one edge 9 and shaped somewhat acute at edge 10. As a further inducement for a child to become familiar with the shapes of letters and numbers, the set or kit may include one or more pieces of sandpaper which the child can use to smooth the surfaces of wood blocks and to round their edges. To facilitate that experience, at least one of the auxiliary tracks 7 is provided with edges as just described to serve as a sanding block for inside curves and angles of certain letters and numbers. The set may include several auxiliary tracks 6 and 7 and short pieces of track as in FIG. 2.

The tracks 2, 6 and 7 are preferably also of wood. However, they can be made of other materials, such as metal or plastic.

Figure 6:
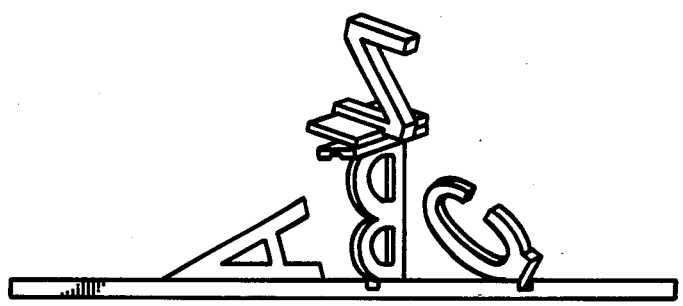
FIG. 6 is a side view of a representative random assemblage of letter blocks on the main support track, involving the use of two auxiliary support tracks between the upper letter Z and the lower letter B.

FIG. 6 illustrates a random assemblage of four letter blocks 1, viz. A, B, C and Z, which a small child might assemble from the set. The letter A has been inserted on its side in groove 3. The letter B is placed inverted and backwards in transverse groove 4. The letter C is tilted backwards in groove 5. The groove 3a or 3b of an auxiliary track has been wedged down on the upper portion of block B, which serves as a support therefor. Finally the letter Z has been set inverted in the groove 3a or 3b of another auxiliary track as shown. The latter auxilliary track has been placed on the first at a random angle. Alternatively, only one auxilliary track 6 could be used to connect the letters B and Z, but at predetermined right angles. The emphasis here is on untutored or spontaneous assemblage, which can be important when the child is first becoming aware of letters and numbers. Later, the child can be expected to assemble the blocks in a more meaningful array. For example, a child may want to spell out his or her name. Accordingly, at the parent's request, the set may contain duplicate blocks as necessary for that purpose.

While the foregoing specification describes the best mode I contemplate for practicing my invention, it should not be taken as limiting the invention, which is defined by the following claims.

I claim:

1. A set of educational letters and/or numerals comprising a plurality of relatively thin blocks of uniform thickness, each in the shape of a letter of the alphabet or numeral and having extended lower portions, and a main support track having a longitudinal groove in its upper face of substantially the same width as the thickness of each block, for snug reception of said extended lower portions or other edge portions of the blocks, and one or more auxiliary support tracks of shorter length but having similar grooves, whereby blocks can be supported individually and one block can be stacked on top of another in any desired orientation.

2. A set as in claim 1, wherein the main track has one or more further grooves intersecting the longitudinal groove transversely.

3. A set as in claim 2, wherein the angles between the further grooves and the longitudinal groove are other than right angles.

4. A set as in claim 1, wherein the auxilliary support tracks have grooves in opposite faces.

5. A set as in claim 1, wherein the blocks are of wood.

6. A set as in claim 5, further comprising sandpaper for smoothing the surfaces and edges of the blocks and tracks, and wherein at least one of said auxiliary support tracks has a rounded outer edge and an edge at an acute angle to facilitate its use as a sanding block for inside edge portions of various blocks.

* * * * *